United States Patent Office 2,949,526
Patented Aug. 16, 1960

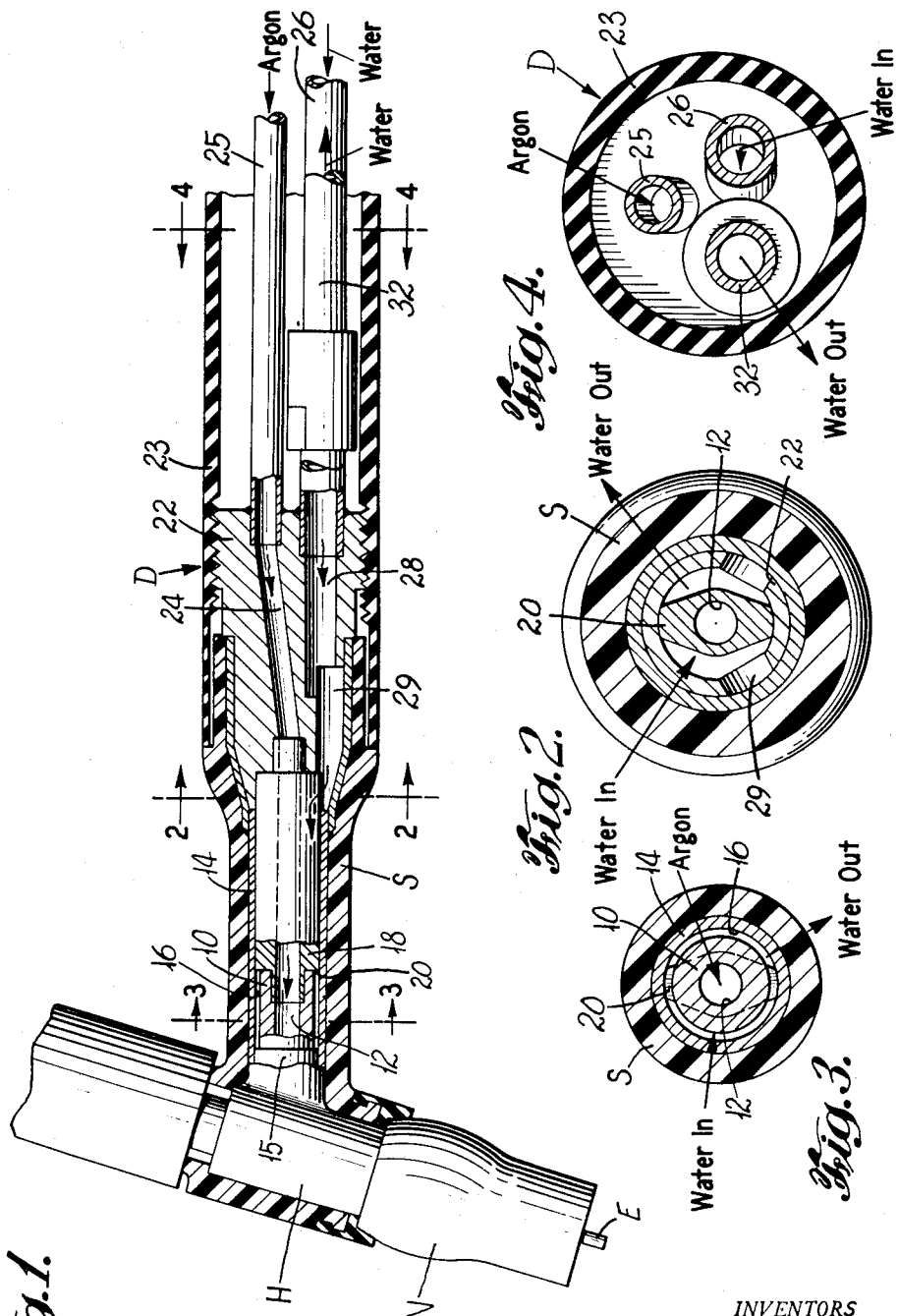

2,949,526

GAS SHIELDED ARC TORCH

Clifford W. Hill, Mountainside, and William J. Blanchard, Sr., Parlin, N.J., assignors to Union Carbide Corporation, a corporation of New York Filed Nov. 13, 1958, Ser. No. 773,742

4 Claims. (Cl. 219—75)

This invention relates to gas shielded arc torches of the water-cooled type.

The capacity of such torches is a function of the cooling efficiency. Commercial forms all have coolant passages in the head of the torch. Torch heads are made as small as possible to get at work difficult of access. The small size restricts the size of the water passages which in turn reduces the cooling and current capacity.

It is, therefore, the main object of the present invention to reduce the size of the torch head while increasing the cooling efficiency and consequent current-carrying capacity of torches of this character.

According to the present invention, the torch head is constructed of metal of high heat conductivity for the rapid conduction of heat therethrough away from the arcing tip of the electrode, and a water jacket is provided in the neck of the torch close to the torch head. Preferably a handle is joined to the neck for manipulating the torch, and provided with water inlet and outlet passages through the handle for conducting away from the water jacket the water heated therein by the heat conducted thereto through said head from said arcing tip. Preferably the torch head has an integral lateral boss, a sleeve is joined to said boss to form the neck of the torch, and the water jacket surrounds the boss inside the neck. Preferably a metal tube is joined to the boss inside the neck for supplying gas to the nozzle and current to the electrode, and radial vanes on the metal tube engage the inside of the sleeve to form the water inlet and outlet passages.

In the drawings:

Fig. 1 is a side elevation, largely in axial section through a torch, according to the preferred embodiment of the present invention;

Fig. 2 is a section taken along the line 2—2 of Fig. 1;

Fig. 3 is a section taken along the line 3—3 of Fig. 1; and

Fig. 4 is a section taken along the line 4—4 of Fig. 1.

The torch comprises a head H for supporting an electrode E, and a gas directing nozzle N surrounding the electrode E. A neck or shank S is joined to the head H for conducting gas to the nozzle N and current to the electrode E. A handle D is joined to the neck S for manipulating the torch.

The head H is constructed of metal of high heat conductivity, such as chromium-copper, and is preferably provided with an integral lateral boss 10 of the same material and provided with an axial gas passage 12 for conducting shielding gas through the head H to the nozzle N. A sleeve 14 is secured to a shoulder 15 on the boss 10 to form the neck S, and a water jacket 16 is formed surrounding the boss 10 inside the sleeve 14.

A metal tube 18 is fitted inside the neck S, and is joined to the boss 10 to conduct current to the head H and gas through the passage 12. The metal tube 18 has radial vanes 20 engaging the inside of the sleeve 14 to form a baffle separating water inlet and outlet passages for the jacket 16.

The handle D has a metal body 22 with an insulating shell 23 and a bore 24 leading from an argon supply hose 25 to the gas passage through the tube 18 and on through the boss passage 12 and the interior of the head H to the nozzle N. Water from a supply hose 26 passes through a bore 28 and a milled slot 29 in the body 22 into the passage formed between one side of the vanes 20 of tube 18 and the wall of the sleeve 14 into the water jacket 16. From the jacket 16 the heated water passes out on the other side of the vanes 20 and similar passages in the body 22 to the water outlet hose 32.

Tests of this torch produced unexpected results of sufficient cooling to allow the torch to operate continuously for as long as 15 minutes on 225 amperes DCSP, which is considerably higher than the present capacity of the smallest of the other existing gas shielded arc torches and considerably higher than the capacity for which this torch was designed—also, adequate cooling to allow the torch to operate on currents greater than 225 amperes at reduced duty cycles, no collet overheating, ability to pass approximately 33% more water than the much larger torch with the jacket in the head. Also, no clogging of passages due to sediment in the water, and no adverse effects on torch geometry in that the diameter of the head was sufficiently small for insertion into confined spaces during welding, the overall length of the head and cup is small enough to permit use of the torch in confined areas, and the reduced size and weight of the torch is conducive to a very high degree of ease and control along with reduced operator fatigue during manipulation.

What is claimed is:

1. In a gas shielded arc torch comprising a torch head for supporting an electrode and a gas-directing nozzle surrounding said electrode, a neck joined to said head and disposed entirely on the rear side thereof for supplying current to said electrode and gas to said nozzle, and a handle joined to said neck for manipulating the torch, said head being constructed of metal of high heat conductivity for the rapid conduction of heat therethrough away from the arcing tip of said electrode, a water jacket in said neck close to said head means for blocking the passage of water from said jacket to the far side of said head, a water inlet passage through said handle for supplying cooling water to said jacket, and a water outlet passage in said handle for conducting away from said jacket the water heated therein by the heat conducted thereto through said head from said arcing tip.

2. In a gas shielded arc torch comprising a torch head for supporting an electrode and a gas-directing nozzle surrounding said electrode, a neck joined to said head and disposed entirely on the near side thereof, a metal tube in said neck for supplying current to said electrode and gas to said nozzle, and a handle joined to said neck for manipulating the torch, said head being constructed of metal of high heat conductivity for the rapid conduction of heat therethrough away from the arcing tip of said electrode, a water jacket in said neck close to said head and surrounding the gas-conducting passage from said tube, means for blocking the passage of water from said jacket to the far side of said head, a water inlet passage in said handle for supplying cooling water to said jacket, and a water outlet passage in said handle for conducting away from said jacket the water heated therein by the heat conducted thereto through said head from said arcing tip.

3. In a gas shielded arc torch comprising a torch head for supporting an electrode and a gas directing nozzle surrounding said electrode, said torch head having an integral lateral boss, a sleeve secured to said boss forming a neck, a metal tube inside said sleeve for supplying current through said boss and head to said electrode and gas through said boss and head to said nozzle, and a handle joined to said neck for manipulating the torch, said head and boss being constructed of metal of high heat conductivity for the rapid conduction of heat away from the arcing tip of the electrode, a water jacket surrounding said boss inside said sleeve, a water inlet passage through said handle for supplying cooling water to said jacket, and a water outlet passage through said handle for conducting away from said jacket the water heated therein by the heat conducted thereto through said head and boss from said arcing tip.

4. In a gas shielded arc torch comprising a torch head for supporting an electrode and a gas directing nozzle surrounding said electrode, a neck joined to said head, a metal tube inside said neck for supplying current to said electrode and gas to said nozzle, said head being constructed of a metal of high heat conductivity for the rapid conduction of heat away from the arcing tip of the electrode, a water jacket surrounding said tube inside said neck, said metal tube having radial vanes engaging the inside of said neck to form a baffle separating water inlet and outlet passages for said water jacket for conducting away from said jacket the water heated therein by the heat conducted thereto from said arcing tip.

References Cited in the file of this patent

UNITED STATES PATENTS

| | | |
|---|---|---|
| 2,468,805 | Herbst | May 3, 1949 |
| 2,606,988 | Dove | Aug. 12, 1952 |
| 2,761,049 | McElrath et al. | Aug. 28, 1956 |